Aug. 15, 1944.  S. M. RANSOME  2,355,677
CLAMPING DEVICE
Filed Nov. 2, 1942

INVENTOR
Stafford M. Ransome
BY
Parker, Carlson, Pitzner & Hubbard
ATTORNEYS

Patented Aug. 15, 1944

2,355,677

UNITED STATES PATENT OFFICE 2,355,677

CLAMPING DEVICE

Stafford M. Ransome, Rockford, Ill., assignor to Barber-Colman Company, Rockford, Ill., a corporation of Illinois Application November 2, 1942, Serial No. 464,181

6 Claims. (Cl. 90—11)

The invention relates to devices for clamping a slidable member in its supporting guideway.

One object of the invention is to provide a novel arrangement of clamping devices so associated with a slidable element to effect clamping thereof at a plurality of points simultaneously under the control of a single manually operable element.

Another object of the invention is to provide a new and improved clamp actuator of the pneumatic or pressure fluid operated type.

Other objects and advantages will become apparent in the following description and from the accompanying drawing in which.

Figure 1:
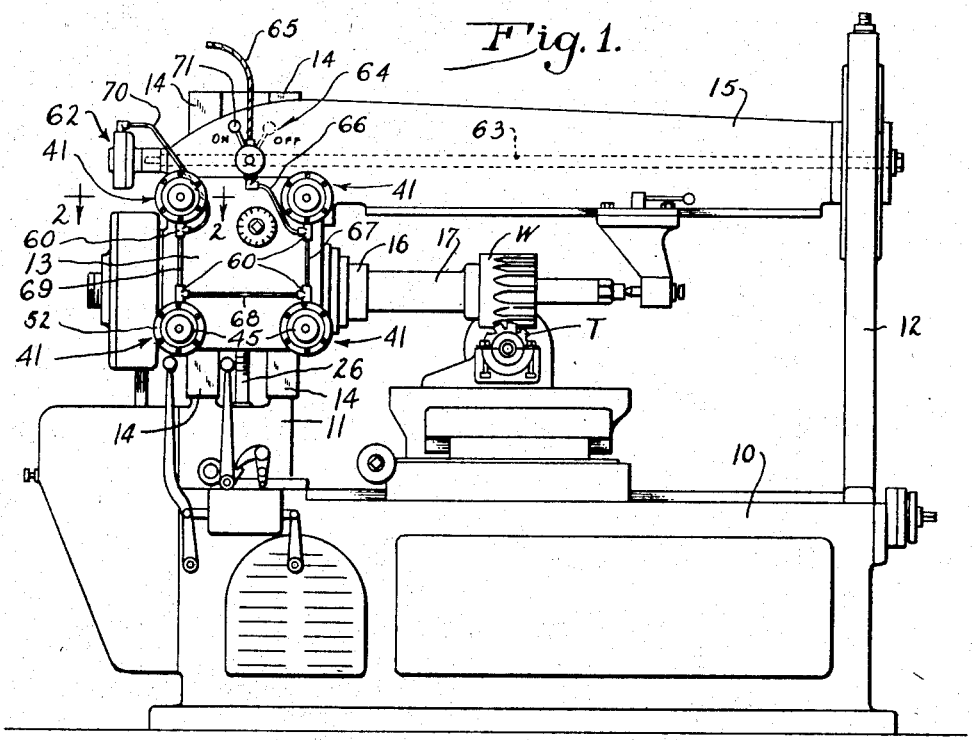
Figure 1 is a front elevational view of a hobbing machine equipped with a slide clamping means embodying the features of my invention.

In the drawing, the invention has been shown merely for purposes of illustration embodied in a hobbing machine. The invention is, however, susceptible of application for clamping other types of slidable members in their guideways, and it is to be understood, therefore, that I do not intend to limit the invention by the present exemplary disclosure but aim to cover all modifications and alternative constructions falling within the spirit and scope of the invention as expressed in the appended claims.

The hobbing machine illustrated has a horizontal bed 10 which supports a pair of spaced upright columns 11 and 12. A work slide 13 is guided for vertical movement along rectangular ways 14 formed on the front of the column 11. An overarm assembly 15 is carried by the slide and its free end is slidable along the column 12. Journaled in the slide 13 is a spindle 16 adapted to be connected to one end of a work arbor 17 supporting a gear blank W operated upon by the hobbing cutter T.

The work slide 13 is mounted for vertical movement on the ways 14, and may be translated by any suitable means such as a manually adjustable nut on the slide, coacting with a non-rotatable vertical screw 26.

Figure 2:
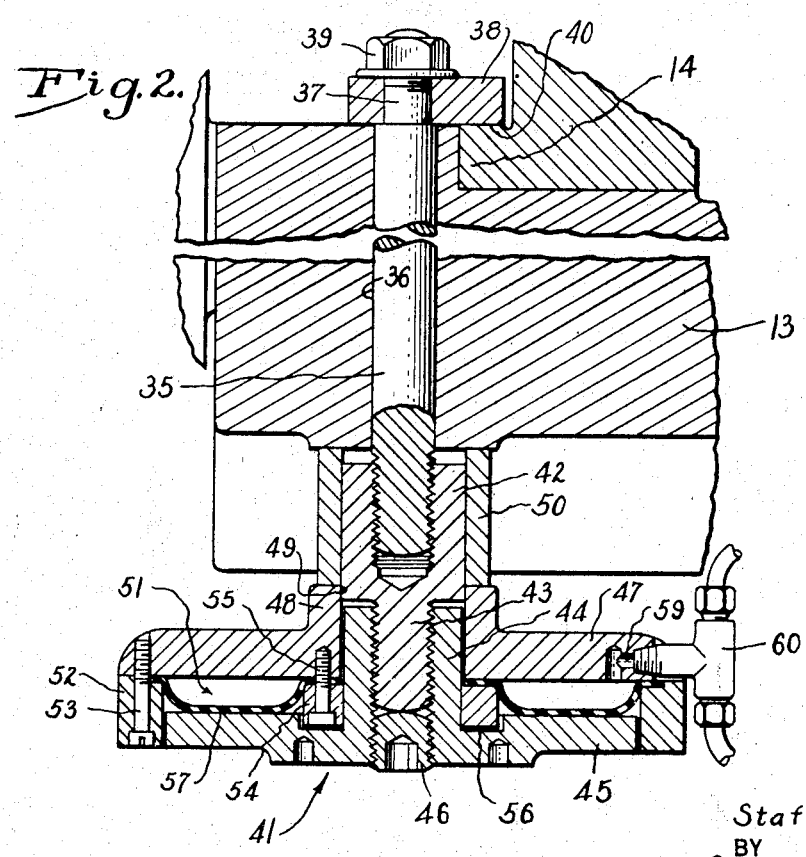
Fig. 2 is a fragmentary section taken along line 2—2 of Fig. 1.

In order to secure rigidity during the cutting operation, the work slide is clamped on the ways 14 at a plurality of points after it has been vertically positioned for the proper depth of cut. I have chosen this clamping operation for the purpose of illustrating one application of the features of the instant invention, it being understood, of course, that such adaptation is by no means exclusive. Referring more particularly to Fig. 2, each clamp includes a bolt 35 slidable in a transverse bore 36, opening to the front and rear of the work slide. A reduced threaded extension 37 on the rear end of the bolt carries a clamping block, or dog, 38 confined by a nut 39. The block projects laterally from the bolt for clamping engagement with a rear face 40 on the rectangular way 14. The bolt 35 extends from the front of the work slide for selective actuation by a fluid-operated clamp actuator, generally indicated at 41.

The clamp actuator 41 embodies a pair of coacting pressure-responsive elements so arranged that, upon introduction of pressure fluid between them, they tend to move relatively in opposite directions, one reacting against the movable slide 13 and the other reacting equally and oppositely, through the bolt 35 and block 38, against the slide support. In the present instance, the forward end of the bolt 35 is screw-threaded in an adaptor 42, having a reduced axial extension 43 threaded in a hub 44 of a plate 45, which forms one of the reacting elements of the pressure fluid operated actuator 41. A socket-type screw 46 may be provided for adjustably locking the plate element 45 with respect to the adaptor. It will be apparent that in assembly, the block 38, bolt 35, adaptor 42, and plate 45 constitute a rigid, axially movable unit. Spaced inwardly from the plate 45 is a second plate 47 of relatively larger diameter, which constitutes the other reacting element of the actuator. This plate has a hub 48 and a central bore 49, which encircles the hub 44 of the plate 45 and telescopes slidably over the forward end of the adaptor 42. Interposed in abutting relation between the hub 48 and the slide 13 is a spacing sleeve 50, which slidably receives the adaptor.

Between the spaced plates 45 and 47 of the actuator an annular fluid chamber 51 is externally defined by an annular ring 52, bolted at 53, against the outer peripheral edge of the plate 47. The chamber is defined internally by an annular ring 54 bolted, as at 55, to the inner peripheral edge of the plate 47, and which slidably receives the hub 44 of the plate 45. An annular recess 56 is formed in the plate 45 to accommodate the ring 54 when the plates are closely spaced, as seen in Fig. 2.

In order to tightly seal the fluid chamber 51 and, at the same time, eliminate the necessity of a close fit between the piston plate 45 and the cylinder therefor defined by the ring 52, a flexible diaphragm ring 57, formed of material such as rubber or the like, is clamped at its inner and outer edges against the plate 47. The diaphragm is sufficiently loose and resilient to bear against and actuate the plate 45 upon application of pressure fluid between the plate 47 and the diaphragm. To this end, the plate 47 is formed with a pressure fluid inlet 59 in communication with the chamber 51 and with a pressure T-fitting 60 threaded therein.

In operation, upon introduction of pressure fluid to the chamber 51, the coacting elements 45 and 47 tend to move relatively in opposite directions, the plate 47 reacting through the spacing sleeve 50 against the slide 13, and the plate 45 reacting equally and oppositely through the clamping bolt and block 38 against the rear face 40 of the slide support. Thus, a rigid and firm clamping engagement is obtained, and the slide is firmly secured in position without the necessity for manual actuation of mechanical clamping means. The actuator is so designed as to be conveniently installed in existing machines to supersede nut-and-wrench or manually actuated clamps without substantial machine revision.

A plurality of such clamp actuators 41 is provided, there being four in the present instance, two associated with each of the ways 14. A fifth clamp actuator 62 is provided for operating a clamping bolt 63 which carries a clamp (not shown) for securing the outer end of the overarm assembly 15 to column 12. In order to obviate the necessity for manually and individually tightening a plurality of mechanical clamps successively between each vertical readjustment of the slide and manually and individually releasing such clamps, I have provided a single valve mechanism, generally indicated at 64, for controlling the flow of pressure fluid simultaneously to each of the five clamp actuators. Thus, a suitable source of pressure fluid supply (not shown) is connected through a conduit 65 with the valve 64, from which fluid is distributed to T-fittings 60 on each of the actuators 41 and 64 through pressure fluid conduits 66, 67, 68, 69, and 70. A hand lever 71 is provided for appropriately manipulating the valve to admit or release pressure fluid to and from the actuators. The specific details of the porting arrangement for the valve 64 form no part of the instant invention and accordingly they have not been illustrated. It is sufficient to say their function is to port pressure fluid to the actuators upon manipulation of the hand lever 71 to its "on" position and to release the pressure fluid therefrom when the handle is in its "off" position.

I claim as my invention:

1. Mechanism for clamping a movable member in its supporting guideway having, in combination, a sleeve, a rod slidable therein, a flange on said sleeve, a diaphragm lying against said flange, inner and outer rings clamping the inner and outer margins of said diaphragm against said flange, a disk loosely fitting within said outer ring and connected to said rod, means for admitting fluid under pressure between said diaphragm and said flange whereby to expand the diaphragm against said disk and cause relative axial movement between said rod and sleeve, and means actuated in such movement to clamp said member in said guideway.

2. The combination of, a guide member, a member guided therealong, a sleeve bearing against one of said members, a rod extending through said sleeve and bearing against the other member, two disks lying adjacent each other and respectively connected to said sleeve and rod, a flexible diaphragm having inner and outer peripheral edges clamped against one of said disks, and means for introducing pressure fluid between the intermediate portion of said diaphragm and its supporting disk whereby to separate the disks and thereby clamp said members together.

3. Mechanism for clamping a movable member in its supporting guideway having, in combination, a disk, a diaphragm lying against said disk, inner and outer rings clamping the inner and outer margins of said diaphragm against said disk, a second disk loosely fitting within said outer ring, means for admitting fluid under pressure between said diaphragm and said first disk whereby to expand the diaphragm against said second disk, and means actuated by relative axial movement between said disks to clamp said member in said guideway.

4. Mechanism for clamping a movable member in its supporting guideway having, in combination, a sleeve, a rod slidably guided therein, two axially spaced plates respectively carried by said sleeve and rod, a ring on one of said plates loosely receiving the other plate, means for admitting fluid under pressure between said plates, and an elastic diaphragm secured to said ring and providing a seal preventing the escape of pressure fluid between said ring and said other plate while permitting of relative axial movement therebetween.

5. The combination of a slide adjustable along a guideway, a plurality of spaced clamps adapted when actuated to hold said slide against displacement in said guideway, a pressure fluid operated device for actuating each of said clamps, each device including a pair of coacting fluid actuated elements relatively movable in opposite directions upon introduction of pressure fluid therebetween, and valve means controlling the flow of pressure fluid from a single source to and from all of said devices simultaneously.

6. The combination of a pair of spaced parallel guides, a member having surfaces interfitting with said guides and slidable therealong, a plurality of separate clamps adapted when actuated to press said member against the different guides whereby to distribute the application of the clamping pressure, fluid pressure actuators, one for each of said clamps, and valve means operable to admit pressure fluid to or release the same from all of said actuators and apply or release said clamps simultaneously.

STAFFORD M. RANSOME.